United States Patent
Nammi et al.

(10) Patent No.: US 10,090,980 B2
(45) Date of Patent: Oct. 2, 2018

(54) TRANSMISSION OF DEMODULATION REFERENCE SIGNALS FOR A 5G WIRELESS COMMUNICATION NETWORK OR OTHER NEXT GENERATION NETWORK

(71) Applicant: AT&T Intellectual Property I, L.P., Atlanta, GA (US)

(72) Inventors: SaiRamesh Nammi, Austin, TX (US); Arunabha Ghosh, Austin, TX (US); Salam Akoum, Austin, TX (US); Xiaoyi Wang, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/401,079

(22) Filed: Jan. 8, 2017

(65) Prior Publication Data
US 2018/0198580 A1 Jul. 12, 2018

(51) Int. Cl.
*H04L 27/00* (2006.01)
*H04L 5/00* (2006.01)
*H04L 27/38* (2006.01)
*H04L 27/22* (2006.01)

(52) U.S. Cl.
CPC ........ *H04L 5/0048* (2013.01); *H04L 27/0012* (2013.01); *H04L 27/22* (2013.01); *H04L 27/38* (2013.01)

(58) Field of Classification Search
CPC ........ H04L 5/0048; H04L 27/00; H04L 27/22
See application file for complete search history.

(56) References Cited

U.S. PATENT DOCUMENTS

| | | | |
|---|---|---|---|
| 9,247,537 B2 | 1/2016 | Kim et al. | |
| 9,252,930 B2 | 2/2016 | Qu et al. | |
| 9,344,909 B2 | 5/2016 | Seo et al. | |
| 9,425,946 B2 | 8/2016 | Pourahmadi et al. | |
| 9,444,596 B2 | 9/2016 | Chung et al. | |
| 9,451,625 B2 | 9/2016 | Jongren et al. | |
| 9,479,299 B2 | 10/2016 | Kim et al. | |

(Continued)

OTHER PUBLICATIONS

Rohde&Schwarz (Device to Device Communication in LTE, Whitepaper Application Note 1MA264 https://www.rohde-schwarz.com/gr/applications/device-to-device-communication-in-lte-white-paper_230854-142855.html, Sep. 29, 2015).*

*Primary Examiner* — Jaison Joseph
(74) *Attorney, Agent, or Firm* — Amin, Turocy & Watson, LLP

(57) ABSTRACT

Demodulation reference signals (e.g., DM-RSs) are transmitted for a 5G, or other next generation network using an adaptive DM-RS structure. Demodulation reference signal data representative of demodulation reference signals employable to perform channel estimation of data channels is generated the demodulation reference signal data is transmitted, via a channel other than the data channels, to be used for the channel estimation. The adaptive DM-RS structure can be based on a modulation scheme used for data transmission. An orthogonal variable spreading factor code tree can be used when choosing an orthogonal cover code, and resource mapping for DM-RSs can be made unequal based on analysis of antenna ports. Further, a DM-RS with high resource density can be used to compensate for phase noise.

20 Claims, 14 Drawing Sheets

(56) References Cited

U.S. PATENT DOCUMENTS

| | | |
|---|---|---|
| 9,509,471 B2 | 11/2016 | Kim et al. |
| 9,538,515 B2 | 1/2017 | Papasakellariou et al. |
| 9,735,947 B2 * | 8/2017 | Takeda ................. H04L 5/0073 |
| 2005/0171984 A1 * | 8/2005 | Wang ................ H04W 72/0486 |
| | | 708/100 |
| 2012/0213111 A1 | 8/2012 | Shimezawa et al. |
| 2013/0195032 A1 * | 8/2013 | Goransson ............ H04W 52/16 |
| | | 370/329 |
| 2014/0247778 A1 * | 9/2014 | Gomadam ............ H04L 5/0051 |
| | | 370/329 |
| 2014/0293900 A1 * | 10/2014 | Takeda ................. H04L 5/0073 |
| | | 370/329 |
| 2015/0341153 A1 | 11/2015 | Jongren et al. |
| 2016/0013906 A1 | 1/2016 | Guo et al. |
| 2016/0143055 A1 | 5/2016 | Nammi et al. |
| 2016/0352482 A1 | 12/2016 | Sun et al. |
| 2017/0013641 A1 | 1/2017 | Patel et al. |

\* cited by examiner

TRANSMISSION OF DEMODULATION REFERENCE SIGNALS FOR A 5G WIRELESS COMMUNICATION NETWORK OR OTHER NEXT GENERATION NETWORK

TECHNICAL FIELD

The subject disclosure relates generally to facilitating a wireless communication system. For instance, this disclosure relates to transmission of demodulation reference signals (DM-RSs) for a 5G, or other next generation network.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption and lower latency than 4G equipment.

The above-described background relating to 5G or other next generation networks is not intended to be exhaustive. Other contextual or background information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
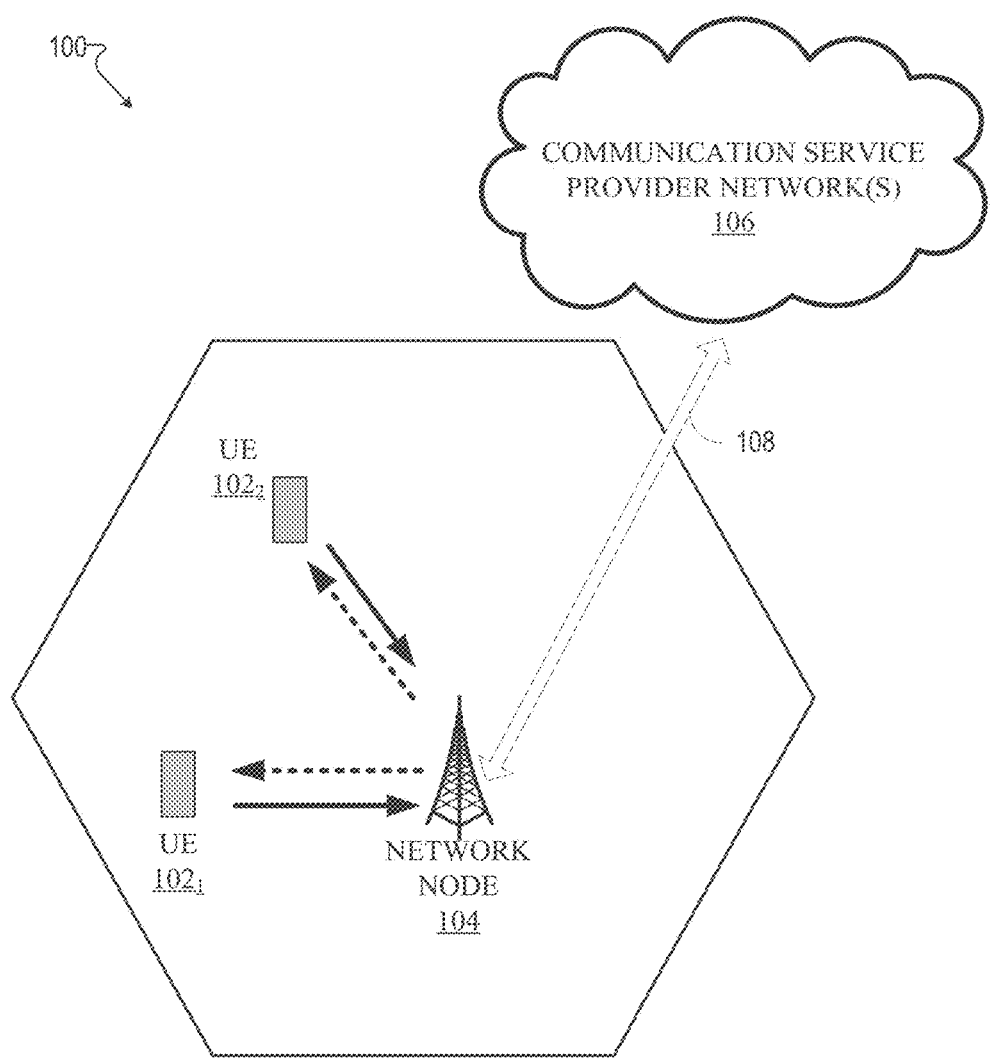
FIG. 1 illustrates an example wireless communication system in which a network node and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative", if used herein, are used to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to transmit demodulation reference signals (DM-RSs) for a 5G or other next generation network. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a machine-readable storage medium or device, e.g., a non-transitory machine-readable storage medium or device.

It should be noted that although various aspects and embodiments have been described herein in the context of 5G, Universal Mobile Telecommunications System (UMTS), and/or Long Term Evolution (LTE), or other next generation networks, the disclosed aspects are not limited to a 5G implementation, a UMTS implementation, and/or an LTE implementation as the techniques can also be applied in 3G, 4G or other LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can generate, encode, transmit, receive, decode, and/or use DM-RSs for a 5G, or other next generation network. Transmitting of DM-RSs, can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), universal serial bus (USB) dongles or devices, etc. Note that the terms element, elements and antenna ports can be interchangeably used and can carry the same meaning in this disclosure. The embodiments are applicable to single carrier as well as to multicarrier (MC) or carrier aggregation (CA) operation of the UE. The term carrier aggregation (CA) is also called (e.g., interchangeably referred to as) "multi-carrier system", "multi-cell operation", "multi-carrier operation", "multi-carrier" transmission and/or reception.

In some embodiments, the non-limiting term radio network node or simply network node may be used. It can refer to any type of network node that serves UE connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, radio remote unit (RRU), radio remote head (RRH), nodes in a distributed antenna system (DAS) etc.

Cloud radio access networks (RANs) can enable the implementation of concepts such as software-defined network (SDN) and network function virtualization (NFV) in 5G networks. In various embodiments herein, techniques for transmitting DM-RSs are provided, or corresponding processes are described, such as generating, encoding, receiving, decoding, and/or using the DM-RSs. Some embodiments of can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied to 5G, also called new radio (NR) access. 5G networks can comprise one or more of the following: data rates of several tens of megabits per second supported for tens of thousands of users, 1 gigabit per second can be offered simultaneously to tens of workers on the same office floor, several hundreds of thousands of simultaneous connections can be supported for massive sensor deployments, spectral efficiency can be enhanced compared to 4G, improved coverage, enhanced signaling efficiency, and reduced latency, compared to conventional LTE systems. In multicarrier systems, such as orthogonal frequency division multiplexing (OFDM), each subcarrier can occupy bandwidth (e.g., subcarrier spacing). If the carriers use the same bandwidth spacing, then the subcarriers can be considered to comprise a single numerology (e.g., single subcarrier spacing). However, if the subcarriers occupy different bandwidth and/or spacing, then the subcarriers can be considered to comprise multiple numerologies (e.g., multiple subcarrier spacing). A subcarrier with a different numerology can interfere with another subcarrier and/or subcarrier spacing.

Downlink reference signals can be predefined signals occupying specific resource elements within a downlink time-frequency grid. There are several types of downlink reference signals that can be transmitted in different ways and used for different purposes by a receiving terminal. Channel state information reference signals (CSI-RSs) can be used by terminals to acquire channel-state information (CSI) and beam specific information (e.g., beam reference signal received power). In 5G, CSI-RS can be user equipment (UE) specific so it can have a significantly lower time/frequency density. DM-RSs, also sometimes referred to as UE-specific reference signals, can be used by terminals for channel estimation of data channels. The label "UE-specific" relates to the DM-RS being intended for channel estimation by a single terminal. The DM-RS can then be transmitted within the resource blocks assigned for data traffic channel transmission to that terminal. Other than the aforementioned reference signals, there are other reference signals, namely multi-cast broadcast single frequency network (MBSFN) and positioning reference signals that can be used for various purposes.

CSI-RS signal transmission is related to estimating the CSI. Although resources used for CSI-RS can be small, when multiple numerologies are deployed within the same OFDM bandwidth, using a conventional approach (as in LTE), estimating the CSI can comprise a CSI-RS resource grid for every numerology. Time-frequency resources for CSI-RS can be numerous and occupy a lot of bandwidth, thereby reducing the number of resources for data transmission. In this regard, significant loss in data throughput can limit the system capacity.

As mentioned, various embodiments of the subject application described herein generally relate to transmission of DM-RSs for a 5G, or other next generation network, e.g., an OFDM network. In this regard, conventionally, when DM-RSs are transmitted within a resource block, the mapping of the data traffic channel to the time-frequency grid of the resource block is modified to avoid the resource elements in which the reference signals are transmitted, leaving fewer resources for the data traffic channel as a consequence. However, if the number of resource elements is reduced for the DM-RS, the quality of the channel estimation for demodulation can be impacted negatively. Hence, various embodiments herein optimize the resource elements for the DM-RS without compromising the performance of channel estimation for data demodulation.

Accordingly, various embodiments enable a DM-RS uses fewer resources than conventional systems, and that does not compromise with respect to the performance of channel estimation for data demodulation. In one non-limiting aspect, a DM-RS structure is generated and transmitted based on the modulation scheme used for data transmission, which achieves the foregoing goals. In another non-limiting aspect, an orthogonal variable spreading factor (OVSF) code tree can be used to choose orthogonal cover codes (OCC). In another example aspect, unequal resource mapping is employed for a DM-RS based on antenna port. In still another example aspect, a DM-RS reference signal can be used with a high resource density for compensation of phase noise as well as for estimation of the channel for data demodulation.

Accordingly, a DM-RS can be transmitted with a smaller number of resources and such transmission does not adversely affect the channel estimation performance for data demodulation. By way of further background, in a cellular system, terminals experience large signal fading and small scale fading. As a result, the respective signal to noise ratios of the terminals are different. Thus, some terminals, e.g., ones at the cell edge, use quadrature phase-shift keying (QPSK) transmission while other terminals use 64-quadrature amplitude modulation (64-QAM) or 256-QAM, e.g., high signal interference-to-noise ratio (SINR) users or UEs which are close to the BS. Channel estimation performance depends on the number of resource elements allocated for the reference signals, e.g., if a large number of resources are allocated for reference signals, then the channel estimation error is correspondingly small, and if a small number of resource elements are used for reference signals, the channel estimation error is correspondingly large. To address the channel estimation error where fewer resources are available for reference signals, in various embodiments, a modulation specific DM-RS density allocation is set forth.

With the DM-RS structure of the various embodiments, a greater number of resource elements can be allocated for data traffic channel, compared to conventional systems, thereby improving resource utilization for the data traffic channel. Hence, significant gains in link and system throughputs can be achieved. In addition, impairments caused by hardware components in the transmission and receive chains can also be compensated for by the various embodiments described herein. These and other embodiments or implementations are described in more detail below with reference to the drawings.

FIG. 1 illustrates an example wireless communication system 100 in accordance with various aspects and embodiments of the subject disclosure. In example embodiments, system 100 is or comprises a wireless communication network serviced by one or more wireless communication network providers. In example embodiments, system 100 can comprise one or more user equipment (UEs) 102 (e.g., 1021, 1022 . . . 102n), which can comprise one or more antenna panels comprising vertical and horizontal elements. A UE 102 can be any user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. UE 102 can also comprise IOT devices that can communicate wirelessly. UE 102 roughly corresponds to the mobile station (MS) in global system for mobile communications (GSM) systems. Thus, the network node 104 (e.g., network node device) can provide connectivity between the UE and the wider cellular network and can facilitate wireless communication between the UE and the wireless communication network (e.g., the one or more communication service provider networks 106, described in more detail below) via a network node 104. The UE 102 can send and/or receive communication data wirelessly to the network node 104. The dashed arrow lines from the network node 104 to the UE 102 represent downlink (DL) communications and the solid arrow lines from the UE 102 to the network nodes 104 represent uplink (UL) communications.

It is noted that in various embodiments for transmission of demodulation reference signals as described herein, the context is one of downlink DM-RS transmission. However, the same principles can be applied to uplink transmissions as well as side link transmissions, and thus the various embodiments should not be considered limited to downlink transmissions.

The non-limiting term network node (e.g., network node device) can be used herein to refer to any type of network node serving a UE 102 and/or connected to other network nodes, network elements, or another network node from which the UE 102 can receive a radio signal. In typical cellular radio access networks (e.g., UMTS networks), they can be referred to as BTSs, radio base stations, radio network nodes, base stations, NodeB, eNodeB (e.g., evolved NodeB), etc.). In 5G terminology, the node can be referred to as a gNodeB (e.g., gNB) device. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network node 104) can include but are not limited to: NodeB devices, BS devices, AP devices, and RAN devices. The network node 104 can also include MSR radio node devices, comprising: an MSR BS, an eNodeB, a network controller, an RNC, a BSC, a relay, a donor node controlling relay, a BTS, a transmission point, a transmission node, an RRU, an RRH, nodes in a DAS, and the like.

System 100 can further comprise one or more communication service provider networks 106 that facilitate providing wireless communication services to various UEs, comprising UE 102, via the network node 104 and/or various additional network devices (not shown) included in the one or more communication service provider networks 106. The one or more communication service provider networks 106 can include various types of disparate networks, comprising: cellular networks, femto networks, picocell networks, microcell networks, internet protocol (IP) networks Wi-Fi service networks, broadband service network, enterprise networks, cloud based networks, and the like. For example, in at least one implementation, system 100 can be or can comprise a large scale wireless communication network that spans various geographic areas. According to this implementation, the one or more communication service provider networks 106 can be or can comprise the wireless communication network and/or various additional devices and components of the wireless communication network (e.g., additional network devices and cells, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

In one technique, the UE 102 can send a reference signal back to the network node 104. The network node 104 takes a received reference signal from the UE 102, estimates the condition of the channel, which can be influenced by various factors, such as objects in the line of sight, weather, movement, interference, etc., and after correcting for more issues (e.g., interference), adjusts the beamforming rates for each antenna transmitting to the UE 102, and changes parameters, so as to transmit a better beam toward the UE 102. This ability to select MIMO schemes and use beamforming to focus energy and adapt to changing channel conditions can allow for higher data rates.

Figure 2:
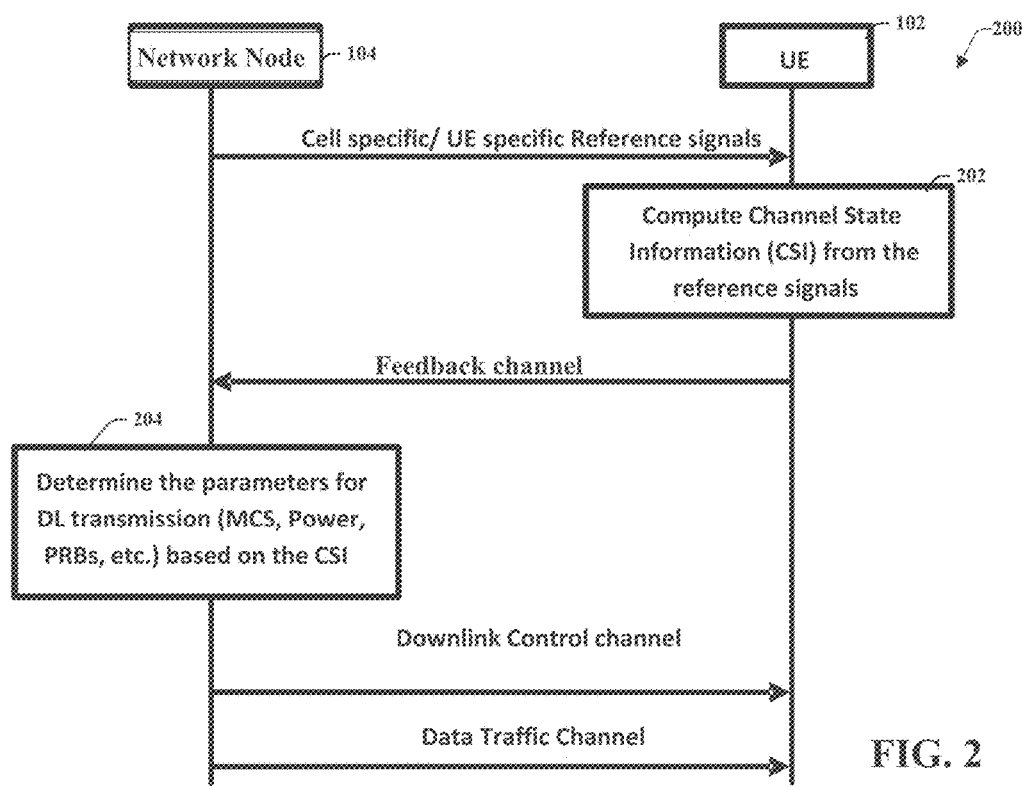
FIG. 2 illustrates an example schematic system block diagram of a message sequence chart between a network node and user equipment according to one or more embodiments.

Referring now to FIG. 2, illustrated is an example schematic system block diagram of a message sequence chart between a network node and user equipment according to one or more embodiments. FIG. 2 depicts a message sequence chart for downlink data transfer in 5G systems 200. The network node 104 can transmit reference signals to a user equipment (UE) 102. The reference signals can be cell specific and/or user equipment 102 specific in relation to a profile of the user equipment 102 or some type of mobile identifier. From the reference signals, the user equipment 102 can compute channel state information (CSI) and compute parameters needed for a CSI report at block 202. The CSI report can comprise: a channel quality indicator (CQI), a pre-coding matrix index (PMI), rank information (RI), a CSI-resource indicator (e.g., CRI, or the beam indicator), etc.

The user equipment 102 can then transmit the CSI report to the network node 104 via a feedback channel either on request from the network node 104, a-periodically, and/or periodically. A network scheduler can leverage the CSI report to determine downlink transmission scheduling parameters at 204, which are particular to the user equipment 102. The scheduling parameters 204 can comprise modulation and coding schemes (MCS), power, physical resource blocks (PRBs), etc. FIG. 2 depicts the physical layer signaling where the density change can be reported for the physical layer signaling or as a part of the radio resource control (RRC) signaling. In the physical layer, the density can be adjusted by the network node 104 and then sent over to the user equipment 102 as a part of the downlink control channel data. The network node 104 can transmit the scheduling parameters, comprising the adjusted densities, to the user equipment 102 via the downlink control channel. Thereafter and/or simultaneously, data can be transferred, via a data traffic channel, from the network node 104 to the user equipment 102.

By way of some further background, MIMO systems can increase the data carrying capacity of wireless systems significantly. MIMO can be used to achieve diversity gain, spatial multiplexing gain and beamforming gain. For these reasons, MIMO is a part of the 3rd and 4th generation wireless systems. In addition, massive MIMO systems are currently under investigation, e.g., for 5G systems, or other next generation networks.

Figure 3:
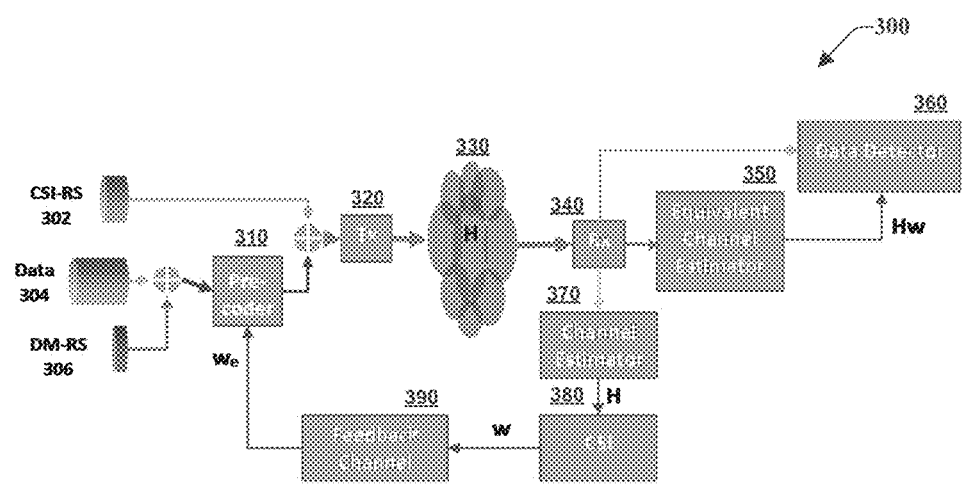
FIG. 3 illustrates an example schematic system block diagram of a multiple input multiple output (MIMO) system with demodulation reference signaling according to one or more embodiments.

In this regard, FIG. 3 illustrates an example schematic system block diagram of a MIMO system with DM-RS according to one or more embodiments. At a transmitter 320 of a gNode B (e.g., network node 102), common reference signals, e.g., CSI-RS 302, are transmitted for channel sounding. A receiver 340 of a UE (e.g., UE 104) estimates channel quality (typically SINR) from channel sounding, and determines a preferred PMI, rank indicator (RI), and CQI for a next downlink transmission. In this respect, generally speaking, channel state information (CSI) includes these examples of channel quality estimate information, and the UE conveys this CSI/information via the feedback channel as discussed in connection with FIG. 2 above. As shown further by the example configuration of FIG. 3, data 304 and DM-RS structure 306 can be added and pre-coded by pre-coder 310, and then further added with CSI-RS 302 for transmission by transmitter 320, via one or more networks 330. In turn, receiver 340 receives the transmitted CSI representing the channel state, and an equivalent channel estimator 350 processes the CSI to form an estimation of a channel that is equivalent to a channel having the CSI. Data detector 360 receives the output of equivalent channel estimator 350, which is used by data detector 360 in connection with decoding data via the data channel.

For example, for a downlink data transmission, the gNode B uses this CSI information and chooses the precoding matrix as suggested by the UE (or the gNode B can choose its own other than the UE recommended PMI), the CQI, the transport block size, etc. Finally, both the reference signals (e.g., DM-RSs) and the data are multiplied by the precoding matrix selected by the gNode B and transmitted by the transmitter 320 of the gNode B. The receiver 340 of the UE can then estimate the effective channel via channel estimator 370, e.g., by a determination of the channel multiplied by the precoding matrix, and the UE can further demodulate the data by data detector 360. Further, from the reference signals, the UE can determine channel state information (CSI) 380 and other parameters for a CSI report sent back to pre-coder 310 of the gNode B via feedback channel 390. As mentioned, the CSI report can comprise: a CQI, a pre-coding matrix index (PMI), rank information (RI), a CSI-resource indicator (e.g., CRI, or the beam indicator), etc.

The user equipment 102 can then transmit the CSI report to the network node 104 via a feedback channel either on request from the network node 104, a-periodically, and/or periodically.

Figure 4:
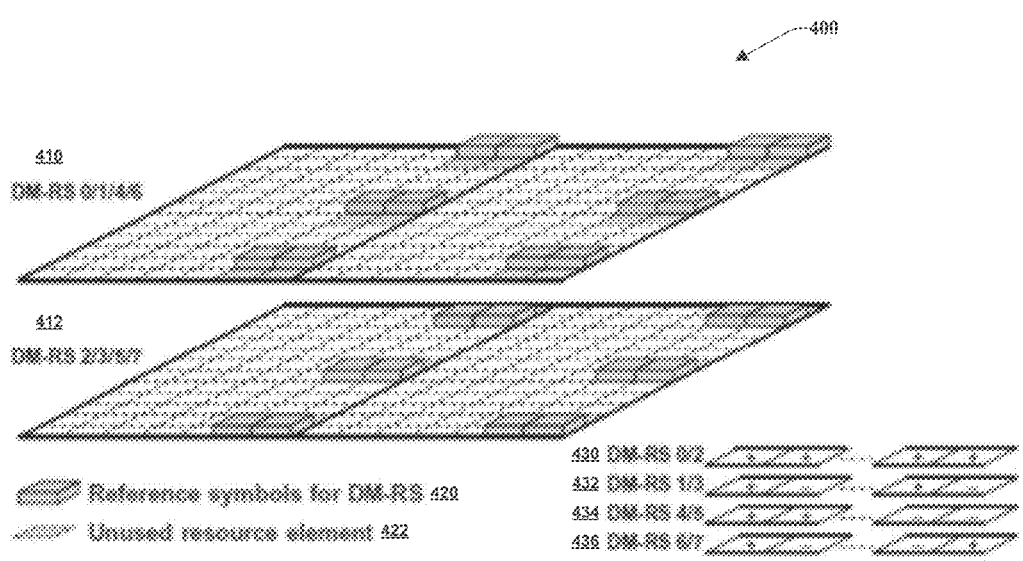
FIG. 4 illustrates an example schematic system block diagram of a demodulation reference signal data structure according to one or more embodiments.

FIG. 4 shows an example DM-RS structure 400 for 8 antenna ports (hence, in this example, a maximum of 8 layers and 8 DM-RSs) for use in DM-RS resource mapping in an LTE system, in accordance with one or more embodiments described herein. In the example of FIG. 4, it is observable that 24 reference symbols within a resource-block pair are transmitted. The reference signals are separated by means of mutually orthogonal signals within each group. In operation, when demodulation reference signals are transmitted within a resource block, the mapping of the physical downlink shared channel (PDSCH) to the time-frequency grid of the resource block is modified to avoid the resource elements in which the reference signals are transmitted.

In this example DM-RS structure 400 of FIG. 4, there are depicted two layers 410 and 412 of structure 400, each representing 4 DM-RSs and each corresponding to 4 of the ports (ports 0, 1, 4, 6, and ports 2, 3, 5, 7, respectively, for layers 410 and 412). Resource elements comprising reference symbols for DM-RSs 420 are depicted as shaded, and raised relative to unused resource elements 422, which are not shaded (this shading/non-shading convention applies to FIGS. 5-8 as well). Further, DM-RS transmissions 430, 432, 434, 436 represent an order that can be applied to such transmissions, e.g., pairing corresponding quadrants of layers 410 and 412, such as DM-RSs 0 and 2, 1 and 3, 4 and 5, and 6 and 7.

As the number of transmitted layers may vary dynamically, the number of transmitted DM-RSs may also vary. In this regard, the terminal, or UE, is informed about the number of transmitted layers, or the rank of transmitted layers, as part of the scheduling information being transmitted via the downlink control channel as described above in connection with FIG. 2.

As mentioned, an issue with conventional systems is that, when demodulation reference signals are transmitted within a resource block, data traffic channel mapping to the time-frequency grid of the resource block is modified to avoid the resource elements in which the reference signals are transmitted, leaving fewer resources for the data traffic channel as a result. However, if the number of resource elements for DM-RSs is reduced, this can impact the quality of the channel estimation for demodulation. Accordingly, as described herein, transmission of demodulation reference signals is performed in a way that uses fewer resources and without compromising on the channel estimation performance for data demodulation.

With the DM-RS structure of the various embodiments described herein, the number of resource elements allocated for data traffic channel can be increased, thereby improving the resource utilization for the data traffic channel. Hence, significant gains in link and system throughputs can be achieved. In addition, the system can efficiently compensate for impairments caused by hardware components in the transmission and receive chains.

Since UEs experience large signal fading and small scale fading, they have different signal to noise ratios, some using QPSK transmission while others use 64-QAM or 256-QAM. It is thus noted that increasing the number of resources for reference signals leads to decreasing the channel estimation error, while decreasing the number of resources for reference signals leads to increasing the channel estimation error.

In one example aspect, in a system with a transmitted symbol x, and a signal tap fading channel with tap weight h, the received signal Y can be given by:

$$Y=hx+n$$

where n is the term that accounts for noise and interference.

As mentioned, at the receiver 340, the signal is passed through the data detector 360. Let h_est be the estimated channel estimated by channel estimator 370. Then, the received signal is equalized with the estimated channel as:

$$h_{est}^{-1}Y=h_{est}^{-1}hx+h_{est}^{-1}n$$

The channel estimation error can be modeled as:

$$h_{est}=h+e$$

where e is the channel estimation error.

Thus, the received signal after equalization can be given by $$z=h_{est}^{-1}Y=(h+e)^{-1}hx+(h+e)^{-1}n$$

which is equal to:

$$z=x+(e)^{-1}x+h_{est}^{-1}n$$

Further, the residual interference can be written as W. Then the received signal is set forth as:

$$z=x+W$$

Hence, with the channel estimation error, the noise is enhanced.

In another example aspect of one or more embodiments, two cases can be considered. In one case, x is the modulated symbol from QPSK constellation and the other case, x is the modulated symbol from 64 QAM constellation. Since the variance of residual interference W is the same in both cases, the respective signal to noise ratios are the same for both cases, which implies that the bit error rate of 64 QAM is inferior to that of QPSK (i.e., at same SINR). This would indicate that higher modulation symbols result in less channel estimation error, while lower modulation symbols may not result in a robust channel estimator. Considering these principles, the adaptive DM-RS structure of the various embodiments herein is thus based on the modulation scheme used for data transmission.

Figure 5:
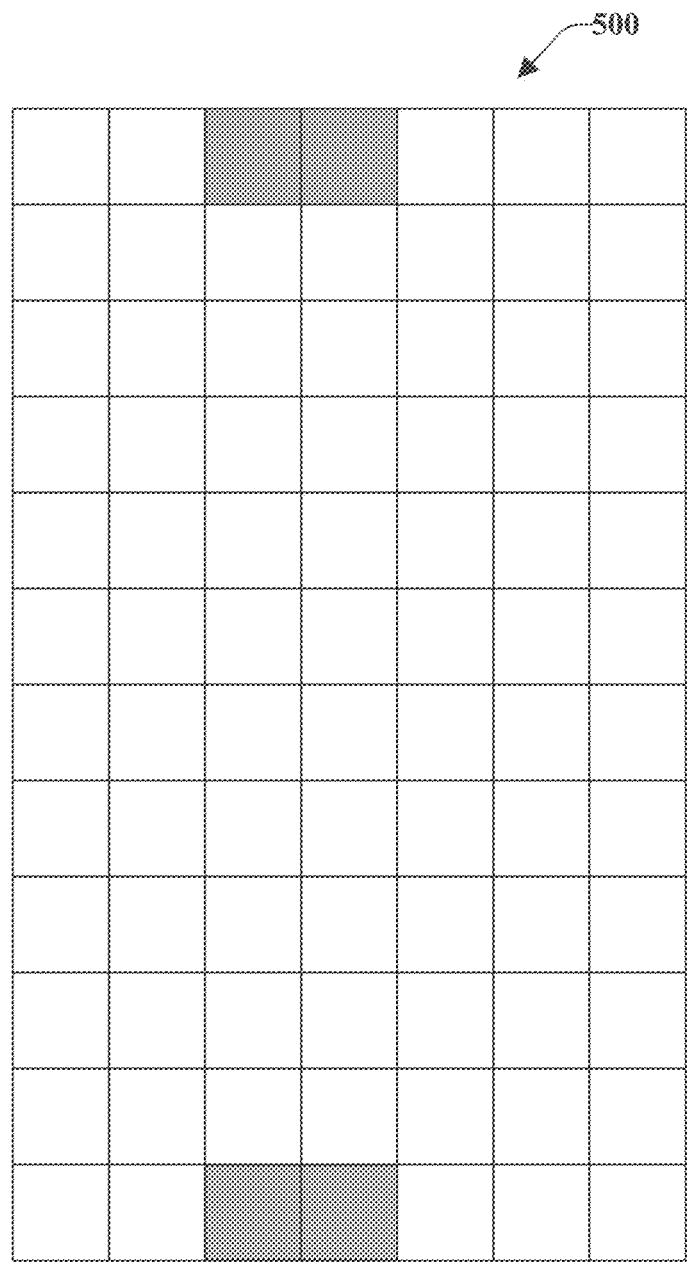
FIG. 5 illustrates an example schematic system block diagram of a first example demodulation reference signal data structure according to one or more embodiments.
Figure 6:
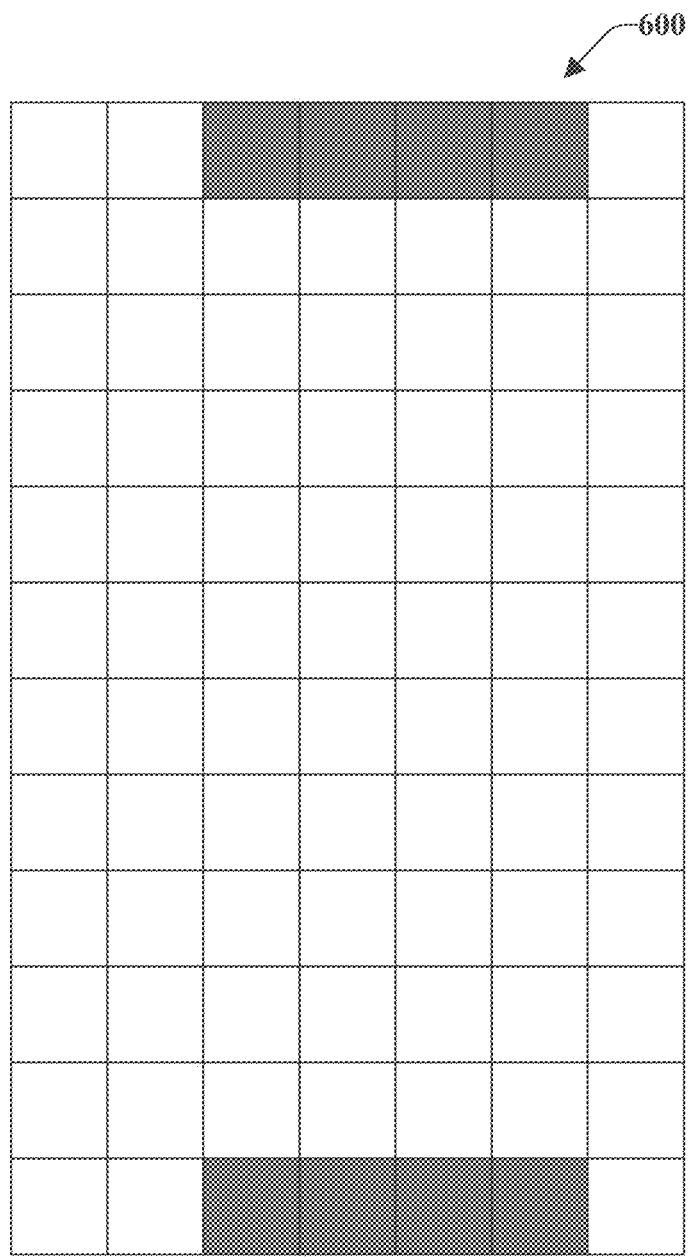
FIG. 6 illustrates an example schematic system block diagram of a second example demodulation reference signal data structure according to one or more embodiments.

In this regard, FIGS. 5-6 illustrate benefits from transmitting a DM-RS structure based on the modulation scheme used for data transmission, as described herein for various embodiments. FIG. 5 is a block diagram of a DM-RS transmission structure 500 for lower modulation schemes. FIG. 6 is a block diagram of a DM-RS transmission structure 600 for higher modulation schemes. In this regard, the network node and the UE comprise a priori knowledge of the DM-RS pattern prior to DM-RS transmission so that if the UE is scheduled with a lower modulation scheme, such as, but not limited to, QPSK, or 16 QAM, then the UE uses the pattern of structure 500 as shown in FIG. 5, and if the UE is scheduled with a higher modulation scheme, such as, but not limited to 64-QAM and 256-QAM, the UE uses the pattern of structure 600 as shown in FIG. 6.

Figure 7:
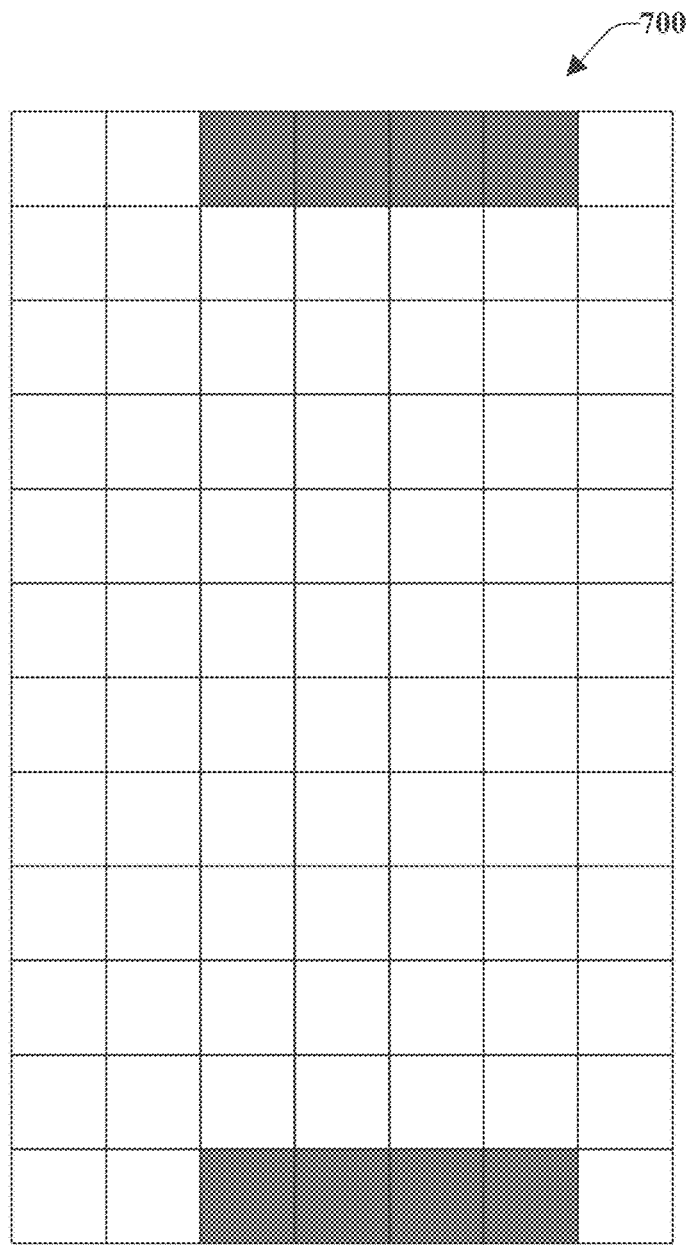
FIG. 7 illustrates an example schematic system block diagram of a third example demodulation reference signal data structure according to one or more embodiments.
Figure 8:
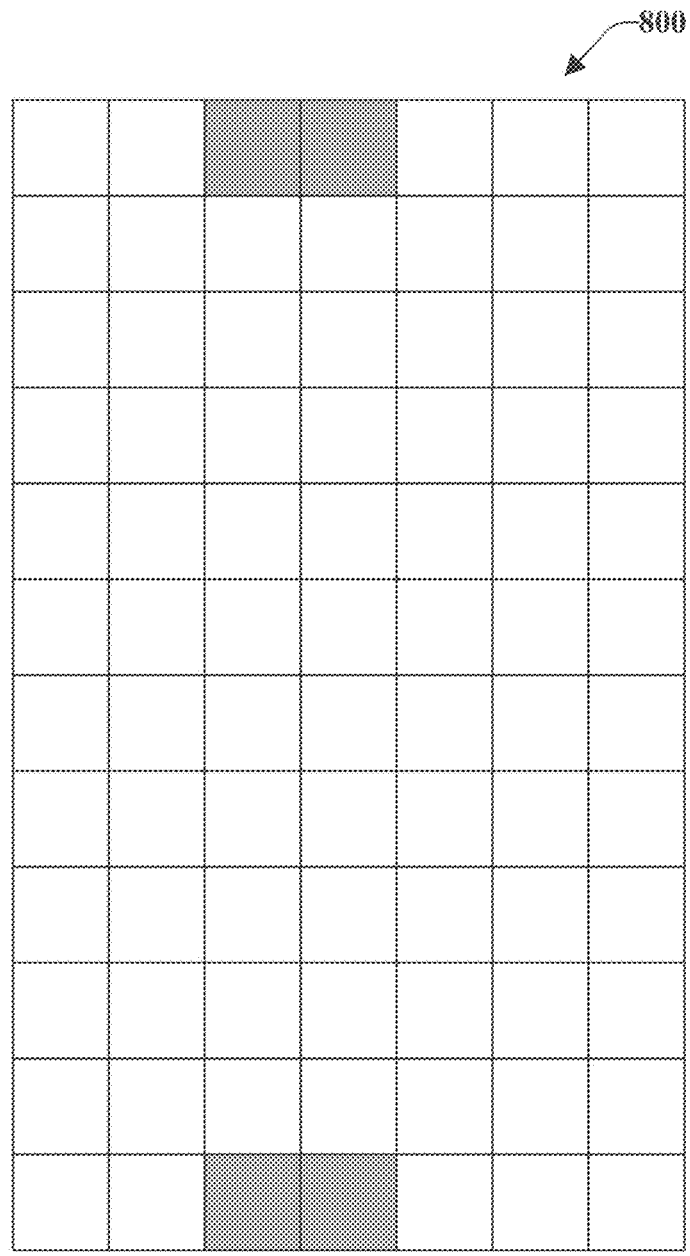
FIG. 8 illustrates an example schematic system block diagram of a fourth example demodulation reference signal data structure according to one or more embodiments.

In another example embodiment, configuration of antenna or port specific reference signals is considered. For instance, in a MIMO system, DM-RS density can be reduced by allocating non-uniform, resource allocation for reference signals, e.g., some ports can be of higher density of DM-RSs while other ports can be of lower density of DM-RSs. For example, FIG. 7 shows a DM-RS structure 700 for antenna port 0 (e.g., a first example antenna), while the DM-RS structure 800 for antenna port 2 (e.g., a second example antenna) is transmitted with a smaller number of resources as shown in FIG. 8.

However, since these two reference signals use the same resource elements, interference can occur during transmission. A conventional way of removing this interference is the use OCC. However, using OCC, when the lengths of the two reference signals are different, orthogonality is lost if random codes from an OCC set are used.

Figure 9:
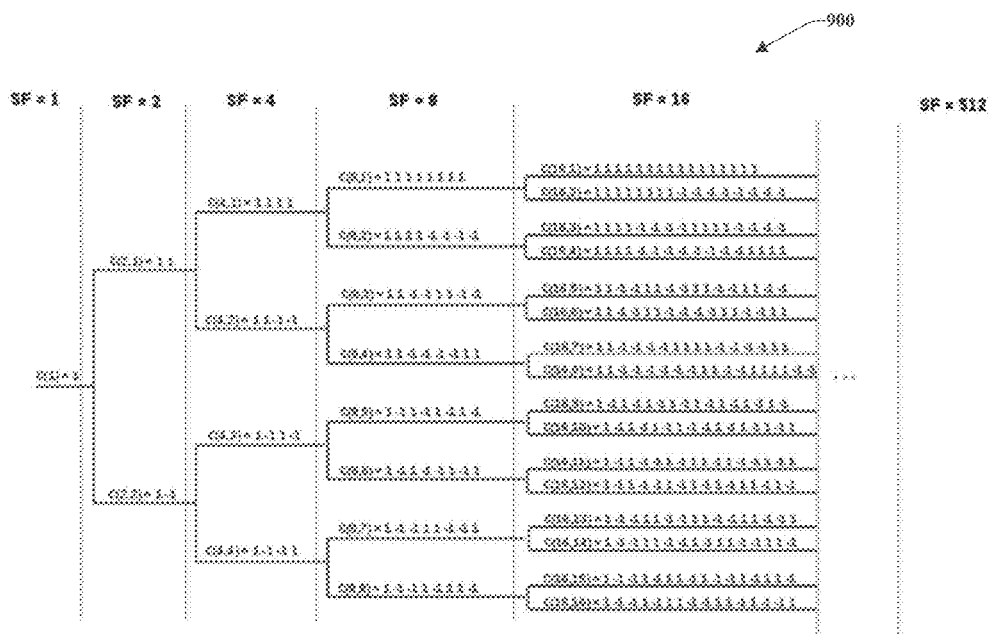
FIG. 9 illustrates an example schematic system block diagram of a data structure that can be used when selecting codes to reduce interference of transmissions of demodulation reference signals according to one or more embodiments.

Hence, for maintaining the orthogonality between the reference signals with unequal resource element density, in one or more embodiments, the reference signal can use codes from an orthogonal variable spreading factor (OVSF) code tree, such as example OVSF code tree 900 of FIG. 9, when selecting the OCC.

In a non-limiting example for additional explanation, a first reference signal has a density of 8 (spreading factor (SF) or number of resource elements in time domain for a single subcarrier), the first reference signal uses the code C(8,1) as shown in OVSF code tree 900 of FIG. 9, and a second reference signal has a density of 2 (SF or number of resource elements in time domain for a single subcarrier). According to OVSF principles, the orthogonality is lost, if any code of SF=2, belongs to the same branch of chosen code of SF=8, i.e., C(4,1) or C(2,1) are not to be used. And, the possibility of C(2,2) remains for the second reference signal in this example. Thus, in some embodiments, an OVSF code tree can be used when choosing the OCC, and resource mapping for DM-RSs can be made unequal based on an antenna port analysis.

In other example embodiments, the DM-RS structures 700 and 800 as proposed in FIGS. 7-8 can be used to compensate a common phase error introduced due to local oscillators at the transmitter and the receiver. Since the phase compensation reference signal uses resource elements on each OFDM symbol, increasing density, in the subject embodiment, the DM-RS signal, which traditionally is used for data demodulation, can also be used for phase noise compensation. For instance, DM-RSs can be used with high density on one antenna port and used with lower density for other antenna ports. Thus, in one or more embodiments herein, DM-RS reference signals with high resource density can be used for compensating the phase noise as well as for estimating the channel for data demodulation.

Figure 10:
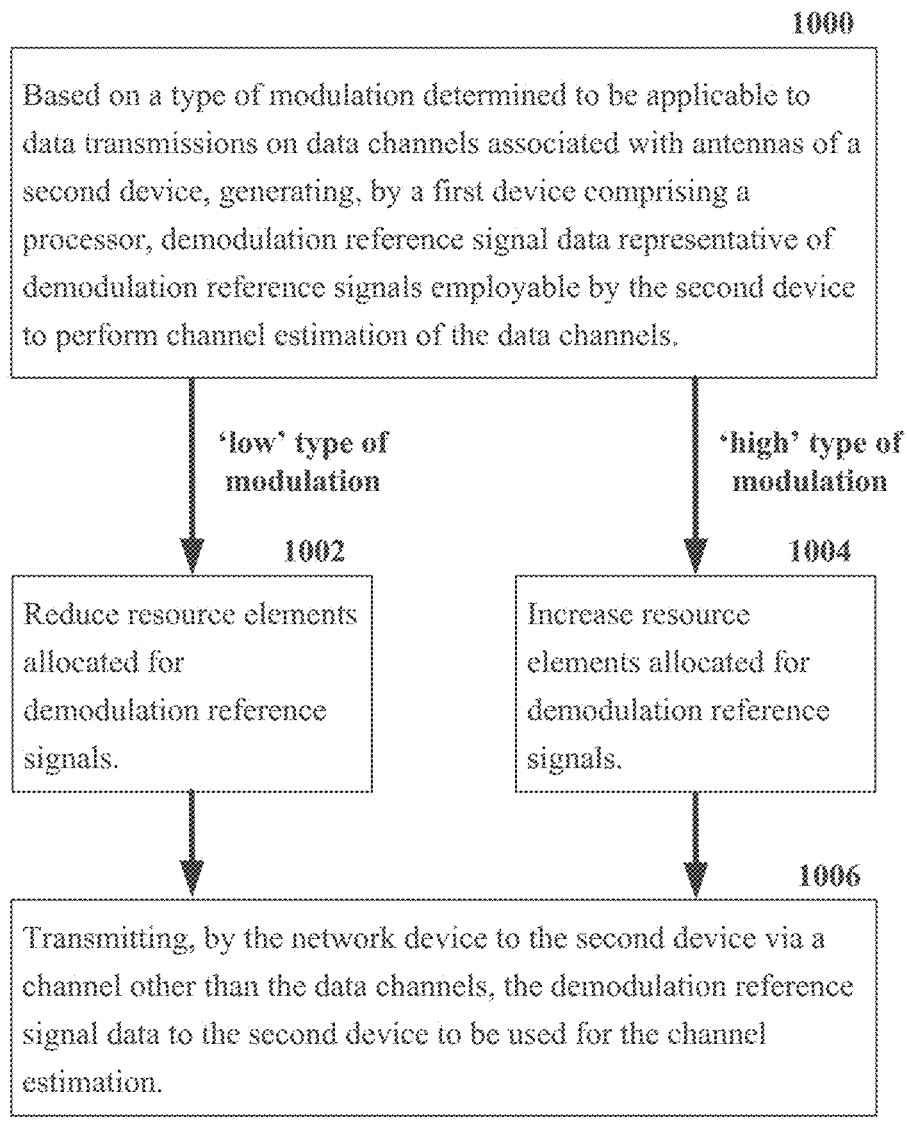
FIG. 10 illustrates a first example flow diagram for facilitating transmissions of demodulation reference signals according to one or more embodiments.

FIG. 10 illustrates a first example flow diagram for facilitating transmissions of demodulation reference signals according to one or more embodiments between a first device and a second device. For instance, for a downlink, the first device can be a network device (e.g., network node 104) that can communicate with the second device being a mobile device (e.g., user equipment 102), or vice versa for an uplink.

At 1000, based on a type of modulation determined to be applicable to data transmissions on data channels associated with antennas of a second device, generating, by a first device comprising a processor, demodulation reference signal data representative of demodulation reference signals employable by the second device to perform channel estimation of the data channels. At 1002, where a low level type of modulation is determined to be applicable, resource elements allocated for demodulation reference signals are reduced. Alternatively to 1002, at 1004, where a high level type of modulation is determined to be applicable, resource elements allocated for demodulation reference signals are increased. In this example, two types or levels of modulation are considered, however, any number of types can be defined, and different numbers of resource elements can be allocated for the demodulation reference signals in the transmitted data structures, as contemplated herein. At 1006, via a channel other than the data channels, the demodulation reference signal data is transmitted by the first device to the second device to be used for the channel estimation. The channel other than the data channels can be the downlink channel. However, as noted previously, the techniques described for the downlink channel can be applied to the uplink channel or side link channel too.

In one case, the type of modulation is determined to be below a threshold level of modulation, and the generating the demodulation reference signal data comprises allocating a first number of resource elements to the demodulation reference signals, where the first number is less than a second number of resource elements that are allocated when the type of modulation is determined to be above the threshold level. In this regard, the type of modulation for such circumstance of being below the threshold level can be quadrature phase-shift keying modulation, or 16-quadrature amplitude modulation, as non-limiting examples.

In another case, the type of modulation is determined to be above a threshold level of modulation, and the generating the demodulation reference signal data comprises allocating a first number of resource elements to the demodulation reference signals, where the first number is greater than a second number of resource elements that are allocated when the type of modulation is determined to be below the threshold level. In this regard, the type of modulation for such circumstance of being above the threshold level can be 64-quadrature amplitude modulation or 256-quadrature amplitude modulation, as non-limiting examples.

In another case, there are multiple thresholds (this case can be extended to any number of thresholds, 2 or more), and the type of modulation is determined to be between a first threshold level and a second threshold level of different threshold levels of modulation. In this case, the generating the demodulation reference signal data comprises allocating a first number of resource elements to the demodulation reference signals, the first number being different than a second number of resource elements that are allocated when the type of modulation is determined to be below the first threshold level, and the first number being different than a second number of resource elements that are allocated when the type of modulation is determined to be above the second threshold level Where the first device is a network device, and the second device is a user equipment, the demodulation reference signal data can be transmitted from the network device to the user equipment via a downlink channel. Where the first device is a user equipment, and the second device is a network device, the demodulation reference signal data can be transmitted via an uplink channel from the user equipment to the network device. Further, the demodulation reference signal data can be transmitted via a side link channel between the first device and the second device.

Figure 11:
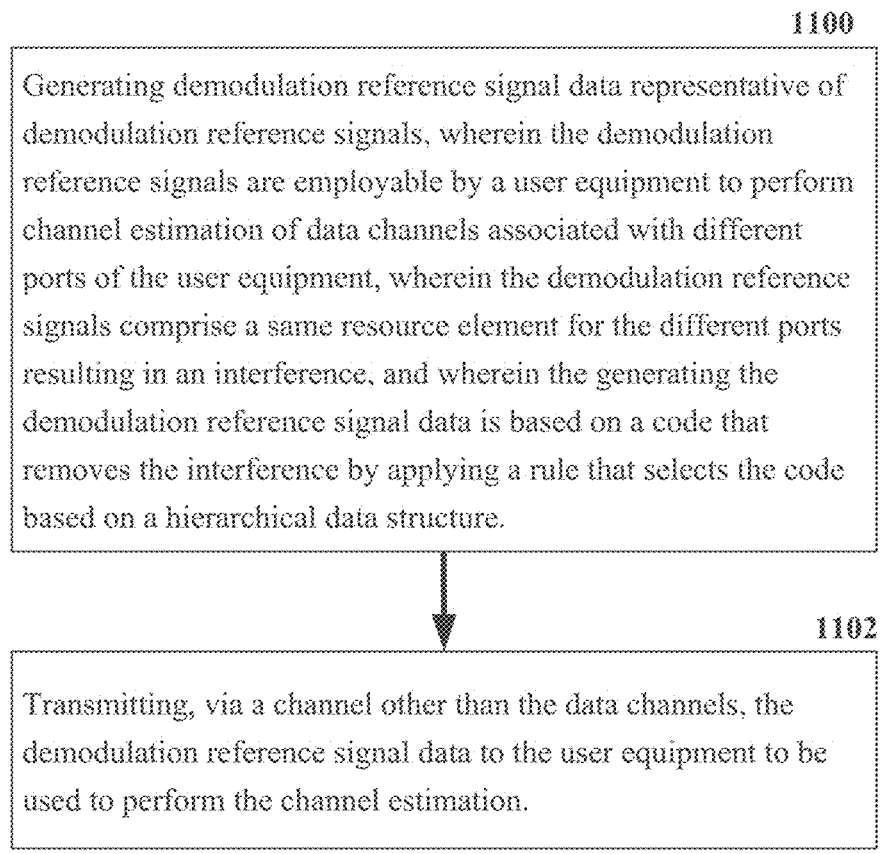
FIG. 11 illustrates a second example flow diagram for facilitating transmissions of demodulation reference signals according to one or more embodiments.

FIG. 11 illustrates a second example flow diagram for facilitating transmissions of demodulation reference signals according to one or more embodiments, performed by a network device comprising a processor and a memory that stores executable instructions that, when executed by the processor, facilitate performance of operations.

As shown at 1100, the operations can comprise generating demodulation reference signal data representative of demodulation reference signals. The demodulation reference signals are employable by a user equipment to perform channel estimation of data channels associated with different ports of the user equipment. The demodulation reference signals comprise a same resource element for the different ports resulting in an interference. Accordingly, in various embodiments, the generating of the demodulation reference signal data is based on a code (e.g., OCC) that removes the interference by applying a rule that selects the code based on a hierarchical data structure (e.g., OVSF code tree). The generating the demodulation reference signal data can comprise allocating resource elements for the demodulation reference signals unequally based on an analysis of corresponding differences of the different ports.

Next, at 1102, the demodulation reference signal data can be transmitted, via a channel other than the data channels (e.g., downlink, uplink, side link, etc.), to the user equipment to be used to perform the channel estimation.

In one non-limiting aspect, the code can be selected based on the hierarchical data structure in response to determining lengths of the demodulation reference signals are different. In another example aspect, the code can be a first code associated with a first spreading factor represented in the hierarchical data structure, and a first reference signal of the demodulation reference signals can be generated based on the first spreading factor. Further, a second reference signal of the demodulation reference signals can be generated based on a second spreading factor represented in the hierarchical data structure that is different than the first spreading factor. In this regard, the code can thus be selected based on a determination of whether a second code associated with the second spreading factor is in a same branch of the hierarchical data structure as the first code.

Figure 12:
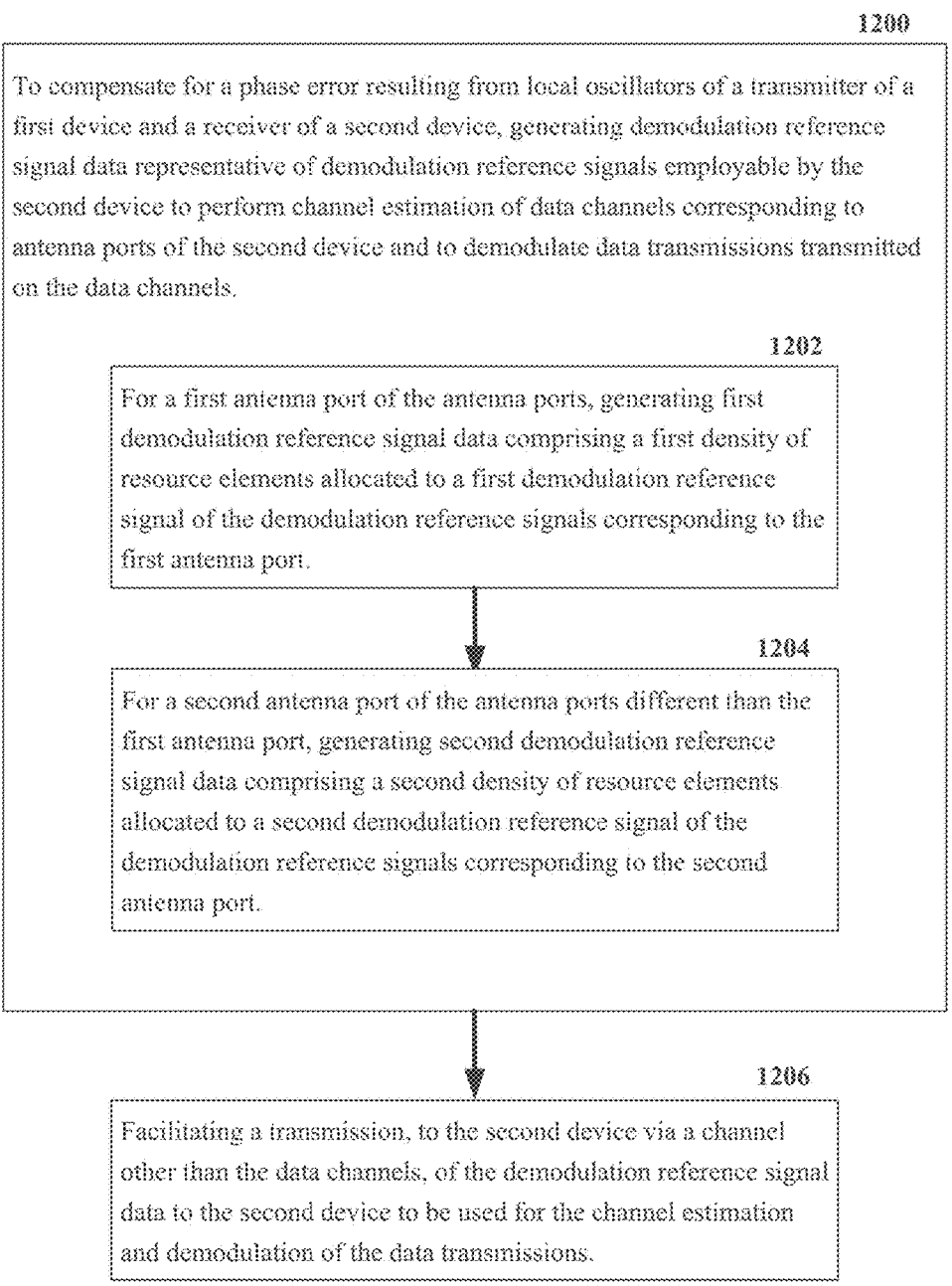
FIG. 12 illustrates a third example flow diagram for facilitating transmissions of demodulation reference signals according to one or more embodiments.

FIG. 12 illustrates a third example flow diagram for facilitating transmissions of demodulation reference signals according to one or more embodiments in which a machine-readable storage medium comprises executable instructions that, when executed by a processor of a first device, facilitate performance of operations.

As shown at 1200, the operations can comprise generating demodulation reference signal data representative of demodulation reference signals employable by the second device to perform channel estimation of data channels corresponding to antenna ports of the second device and to demodulate data transmissions transmitted on the data channels. As shown at 1202, to compensate for a phase error resulting from local oscillators of a transmitter of a first device and a receiver of a second device, the generating the demodulation reference signal data can further comprise, for a first antenna port of the antenna ports, generating first demodulation reference signal data comprising a first density of resource elements allocated to a first demodulation reference signal of the demodulation reference signals corresponding to the first antenna port. As shown at 1204, the generating the demodulation reference signal data can comprise, for a second antenna port of the antenna ports different than the first antenna port, generating second demodulation reference signal data comprising a second density of resource elements allocated to a second demodulation reference signal of the demodulation reference signals corresponding to the second antenna port.

Next, at 1206, the operations can further comprise facilitating a transmission, to the second device via a channel other than the data channels, of the demodulation reference signal data to be used for the channel estimation and demodulation of the data transmissions. In one aspect, the first density of resource elements is defined to be higher than the second density of resource elements.

In one embodiment, the first device is a network device, the second device is a user equipment, and the transmission of the demodulation reference signal data from the network device to the user equipment is via a downlink channel. In another embodiment, the first device is a user equipment, the second device is a network device, and the transmission of the demodulation reference signal data is via an uplink channel from the user equipment to the network device.

It is noted that, for phase noise compensation/correction, one antenna port (e.g., port 0) is given the higher density in the time-domain. In this regard, there can be one set of patterns with higher density in the time domain for phase noise compensation/correction, and there can be another set of patterns with lower density in the time domain. In this regard, the high density can applied to a subset of the antenna ports (e.g., one port, or a small number of ports) and the low density can be applied to the remainder of the ports.

In this regard, phase compensation uses a higher density in time domain. For the avoidance of doubt, this is different from modulation dependent density since the modulation dependent density can be both in time, frequency or both.

Figure 13:
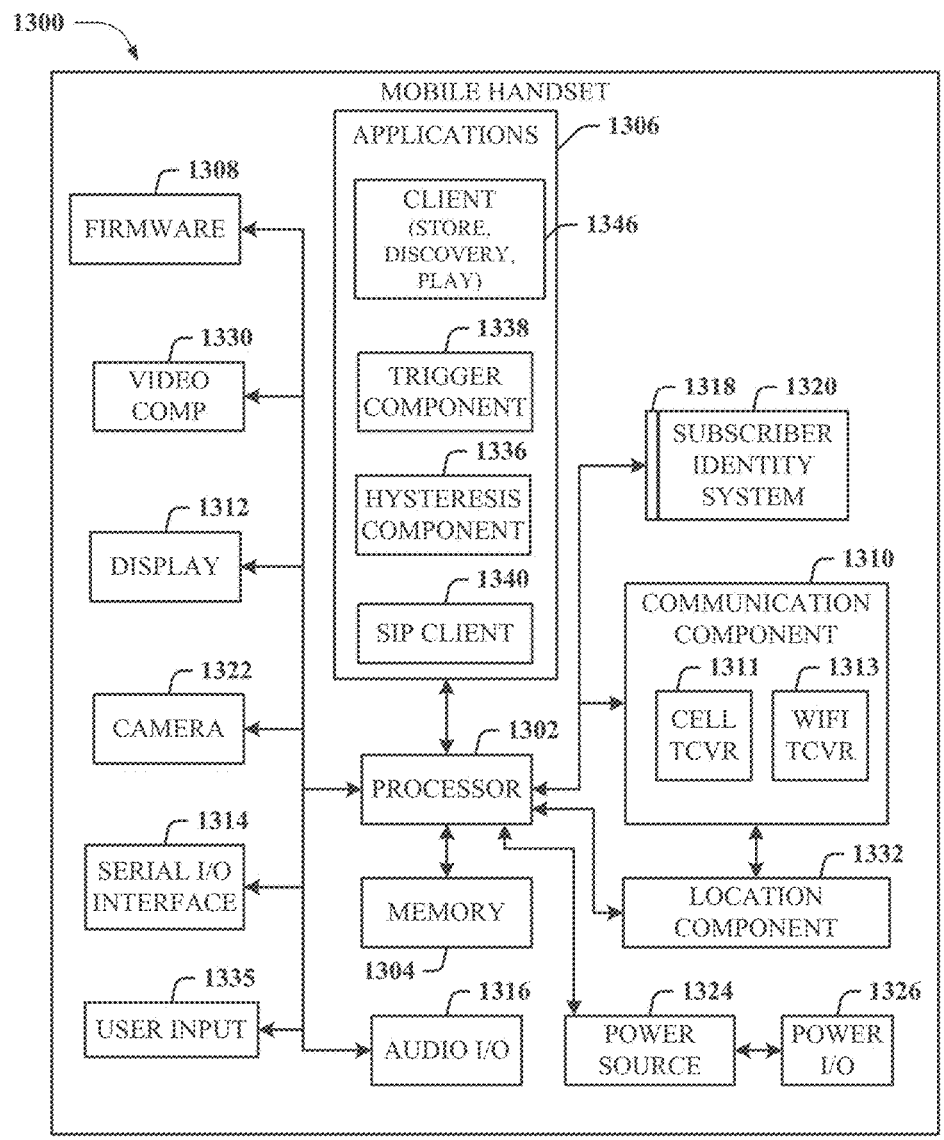
FIG. 13 illustrates an example block diagram of an example mobile handset operable to engage in a system architecture that facilitates secure wireless communication according to one or more embodiments described herein.

Referring now to FIG. 13, illustrated is a schematic block diagram of an exemplary end-user device such as a mobile device 1300 capable of connecting to a network in accordance with some embodiments described herein. Although a mobile handset 1300 is illustrated herein, it will be understood that other devices can be a mobile device, and that the mobile handset 1300 is merely illustrated to provide context for the embodiments of the various embodiments described herein. The following discussion is intended to provide a brief, general description of an example of a suitable environment 1300 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of the any of the above should also be included within the scope of computer-readable media.

The handset 1300 includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM)

or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communication component 1310 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1322 (e.g., a camera) can be provided for decoding encoded multimedia content. The video processing component 1322 can aid in facilitating the generation, editing and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1338 when the Wi-Fi transceiver 1313 detects the beacon of the access point. A session initiation protocol (SIP) client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 810, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Figure 14:
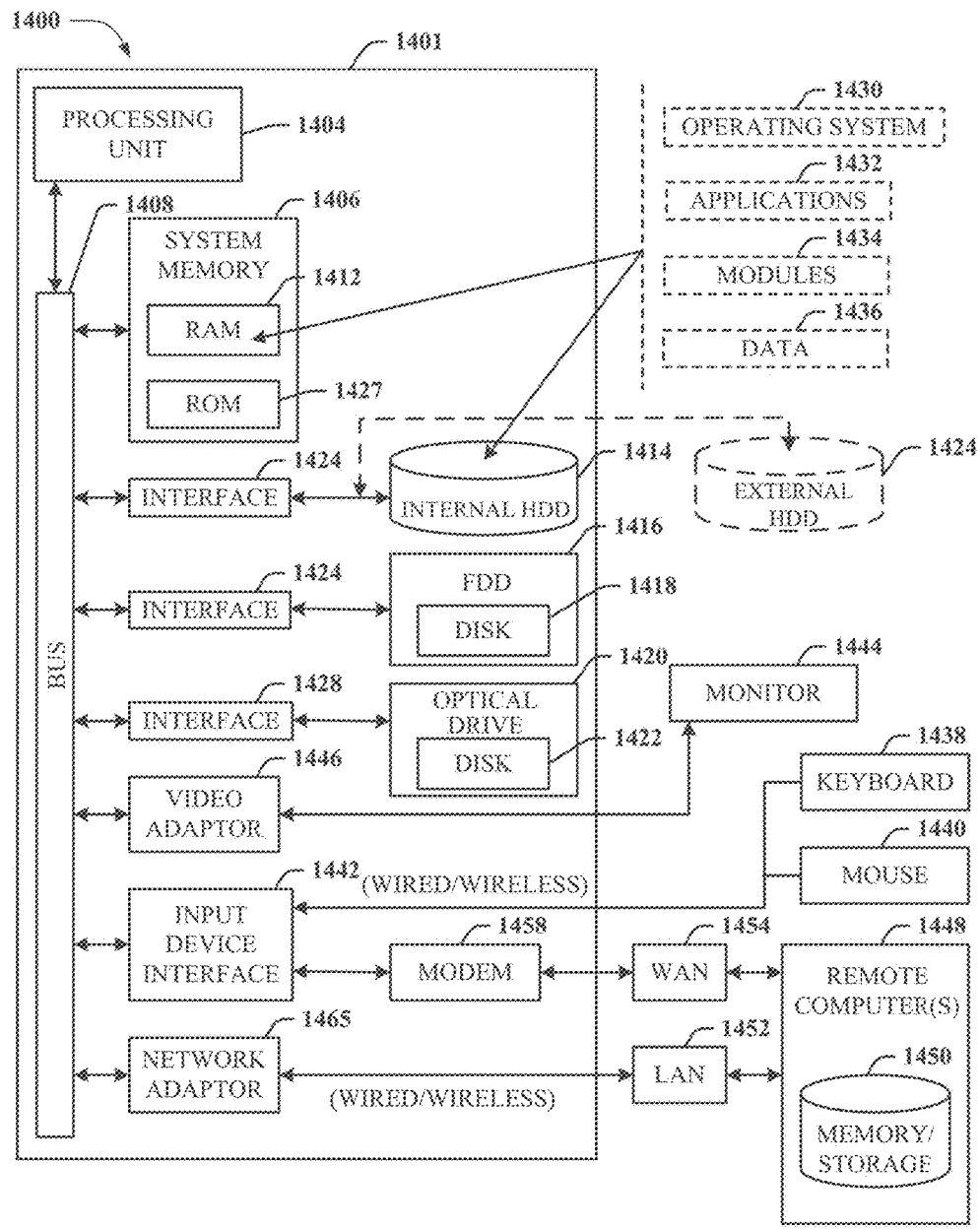
FIG. 14 illustrates an example block diagram of an example computer or device operable to engage in a system architecture that facilitates secure wireless communication according to one or more embodiments described herein.

Referring now to FIG. 14, there is illustrated a block diagram of a computer 1400 operable to execute a system architecture that facilitates establishing a transaction between an entity and a third party. The computer 1400 can provide networking and communication capabilities between a wired or wireless communication network and a server (e.g., Microsoft server) and/or communication device. In order to provide additional context for various aspects thereof, FIG. 14 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 14, implementing various aspects described herein with regards to the end-user device can include a computer 1400, the computer 1400 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes read-only memory (ROM) 1427 and random access memory (RAM) 1412. A basic input/output system (BIOS) is stored in a non-volatile memory 1427 such as ROM, EPROM, EEPROM, which BIOS contains the basic routines that help to transfer information between elements within the computer 1400, such as during start-up. The RAM 1412 can also include a high-speed RAM such as static RAM for caching data.

The computer 1400 further includes an internal hard disk drive (HDD) 1414 (e.g., EIDE, SATA), which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1400 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1400, such as drives, magnetic cassettes, flash memory, cartridges, and the like, can also be used in the exemplary operating environment, and further, that any such media can contain computer-executable instructions for performing the methods of the disclosed innovations.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is to be appreciated that the innovation can be implemented with various commercially available operating systems or combinations of operating systems.

A user can enter commands and information into the computer 1400 through one or more wired/wireless input devices, e.g., a keyboard 1438 and a pointing device, such as a mouse 1440. Other input devices (not shown) may include a microphone, an infrared (IR) remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 through an interface, such as a video adapter 1446. In addition to the monitor 1444, a computer 1400 typically includes other peripheral output devices (not shown), such as speakers, printers, etc.

The computer 1400 can operate in a networked environment using logical connections by wired and/or wireless communications to one or more remote computers, such as a remote computer(s) 1448. The remote computer(s) 1448 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1400 is connected to the local network 1452 through a wired and/or wireless communication network interface or adapter 1456. The adapter 1456 may facilitate wired or wireless communication to the LAN 1452, which may also include a wireless access point disposed thereon for communicating with the wireless adapter 1456.

When used in a WAN networking environment, the computer 1400 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 through the input device interface 1442. In a networked environment, program modules depicted relative to the computer, or portions thereof, can be stored in the remote memory/storage device 1450. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and BLUETOOTH™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An important aspect of 5G, which differentiates from previous 4G systems, is the use of multiple numerologies. LTE systems use a single numerology throughout the whole in band (i.e., within LTE bandwidth, for example 10 MHz, all the sub carriers have spacing or bandwidth of 15 KHz). However, since 5G can support various applications, a single numerology, as in LTE, is not efficient. Hence multiple numerologies are defined to serve diverse applications. For example multiple sub carriers spacing such as 15 KHz, 30 KHz, 60 KHz, 120 KHz, 240 KHz and 480 KHz.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    based on a type of modulation determined to be applicable to data transmissions on data channels associated with antennas of a second device, generating, by a first device comprising a processor, demodulation reference signal data representative of demodulation reference signals employable by the second device to perform channel estimation of the data channels;
    selecting a code based on a hierarchical data structure, wherein the code facilitates removing interference that results from demodulation reference signals for different antennas utilizing a same resource element; and
    transmitting, by the first device to the second device via a channel other than the data channels, the demodulation reference signal data to the second device to be used for the channel estimation.

2. The method of claim 1, wherein the type of modulation is determined to be below a threshold level of modulation, wherein the generating the demodulation reference signal data comprises allocating a first number of resource elements to the demodulation reference signals, and wherein the first number is less than a second number of resource elements that are allocated when the type of modulation is determined to be above the threshold level.

3. The method of claim 2, wherein the type of modulation is determined to be between a first threshold level and a second threshold level of different threshold levels of modulation, wherein the generating the demodulation reference signal data comprises allocating a first number of resource elements to the demodulation reference signals, wherein the first number is different than a second number of resource elements that are allocated when the type of modulation is determined to be below the first threshold level, and wherein the first number is different than the second number of resource elements that are allocated when the type of modulation is determined to be above the second threshold level.

4. The method of claim 2, wherein the type of modulation is determined to be quadrature phase-shift keying modulation or 16-quadrature amplitude modulation.

5. The method of claim 1, wherein the type of modulation is determined to be above a threshold level of modulation, wherein the generating the demodulation reference signal data comprises allocating a first number of resource elements to the demodulation reference signals, and wherein the first number is greater than a second number of resource elements that are allocated when the type of modulation is determined to be below the threshold level.

6. The method of claim 5, wherein the type of modulation is determined to be 64-quadrature amplitude modulation or 256-quadrature amplitude modulation.

7. The method of claim 1, wherein the first device is a network device, wherein the second device is a user equipment, and wherein the transmitting comprises transmitting the demodulation reference signal data from the network device to the user equipment via a downlink channel.

8. The method of claim 1, wherein the first device is a user equipment, wherein the second device is a network device, and wherein the transmitting comprises transmitting the demodulation reference signal data via an uplink channel from the user equipment to the network device.

9. The method of claim 1, wherein the transmitting comprises transmitting the demodulation reference signal data via a side link channel between the first device and the second device.

10. A network device, comprising:
    a processor; and
    a memory that stores executable instructions that, when executed by the processor, facilitate performance of operations, comprising:
        generating demodulation reference signal data representative of demodulation reference signals, wherein the demodulation reference signals are employable by a user equipment to perform channel estimation of data channels associated with different ports of the user equipment, wherein the demodulation reference signals comprise a same resource element for the different ports resulting in an interference, and wherein the generating the demodulation reference signal data is based on a code that removes the interference by applying a rule that selects the code based on a hierarchical data structure; and
        transmitting, via a channel other than the data channels, the demodulation reference signal data to the user equipment to be used to perform the channel estimation.

11. The network device of claim 10, wherein the generating the demodulation reference signal data further comprises allocating resource elements for the demodulation reference signals unequally based on an analysis of corresponding differences of the different ports.

12. The network device of claim 10, wherein the code is an orthogonal cover code.

13. The network device of claim 10, wherein the hierarchical data structure is an orthogonal variable spreading factor code tree.

14. The network device of claim 10, wherein the applying the rule that selects the code based on the hierarchical data structure comprises applying the rule in response to determining lengths of the demodulation reference signals are different.

15. The network device of claim 10, wherein the code is a first code associated with a first spreading factor represented in the hierarchical data structure, wherein a first reference signal of the demodulation reference signals is generated based on the first spreading factor, wherein a second reference signal of the demodulation reference signals is generated based on a second spreading factor represented in the hierarchical data structure that is different than the first spreading factor, and wherein the applying the rule that selects the code based on the hierarchical data structure comprises determining whether a second code associated with the second spreading factor is in a same branch of the hierarchical data structure as the first code.

16. The network device of claim 10, wherein the channel is a downlink channel between the network device and the user equipment.

17. A non-transitory machine-readable storage medium, comprising executable instructions that, when executed by a processor of a first device, facilitate performance of operations, comprising:
  generating demodulation reference signal data representative of demodulation reference signals employable by a second device to perform channel estimation of data channels corresponding to antenna ports of the second device and to demodulate data transmissions transmitted on the data channels,
  wherein the generating the demodulation reference signal data comprises, for a first antenna port of the antenna ports, generating first demodulation reference signal data comprising a first density of resource elements allocated to a first demodulation reference signal of the demodulation reference signals corresponding to the first antenna port,
  wherein the generating the demodulation reference signal data comprises, for a second antenna port of the antenna ports different than the first antenna port, generating second demodulation reference signal data comprising a second density of resource elements allocated to a second demodulation reference signal of the demodulation reference signals corresponding to the second antenna port, and
  wherein the generating the demodulation reference signal data with the first demodulation reference signal data facilitates compensation for a phase error resulting from local oscillators of a transmitter of a first device and a receiver of the second device; and
  facilitating a transmission, to the second device via a channel other than the data channels, of the demodulation reference signal data to the second device to be used for the channel estimation and demodulation of the data transmissions.

18. The non-transitory machine-readable storage medium of claim 17, wherein the first density of resource elements is defined to be higher than the second density of resource elements.

19. The non-transitory machine-readable storage medium of claim 17, wherein the first device is a network device, wherein the second device is a user equipment, and wherein the facilitating the transmission comprises facilitating the transmission of the demodulation reference signal data from the network device to the user equipment via a downlink channel.

20. The non-transitory machine-readable storage medium of claim 17, wherein the first device is a user equipment, wherein the second device is a network device, and wherein the facilitating the transmission comprises facilitating the transmission of the demodulation reference signal data from the user equipment to the network device via an uplink channel.

* * * * *